(No Model.)
H. DUDLEY-COOPER.
CONSTRUCTION OF GLASS OR PORCELAIN LINED JOINTS.
No. 494,671. Patented Apr. 4, 1893.
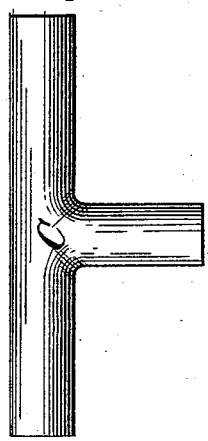
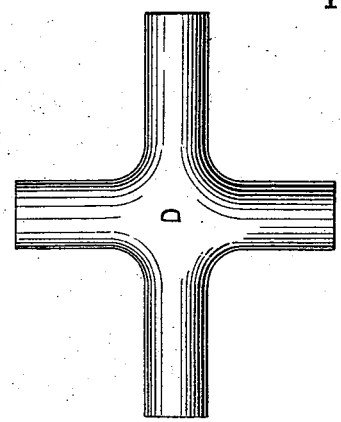
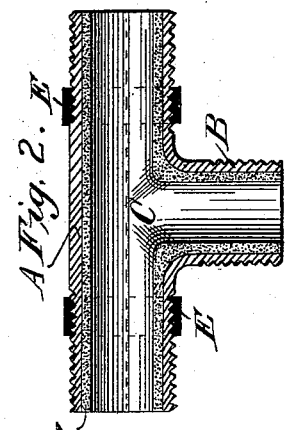
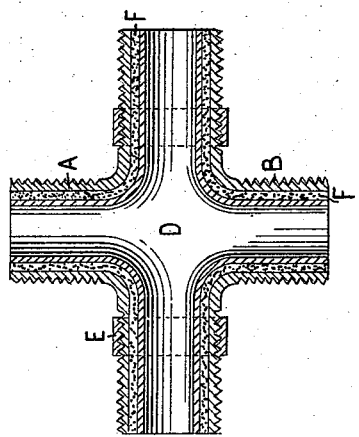
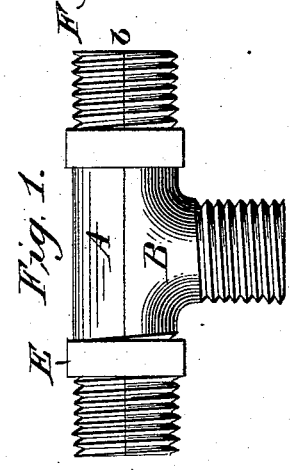
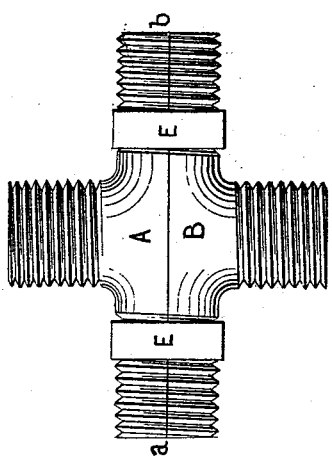
Witnesses.
F. Horton
E. Brown
Inventor
H. Dudley-Cooper
By F. Prince
Attorney

UNITED STATES PATENT OFFICE.

HENRY DUDLEY-COOPER, OF LONDON, ENGLAND, ASSIGNOR TO JAMES KEMP-WELCH, OF SAME PLACE.

CONSTRUCTION OF GLASS OR PORCELAIN LINED JOINTS.

SPECIFICATION forming part of Letters Patent No. 494,671, dated April 4, 1893.

Application filed December 3, 1889. Serial No. 332,480. (No model.) Patented in England February 12, 1887, No. 2,237.

*To all whom it may concern:*

Be it known that I, HENRY DUDLEY-COOPER, a subject of the Queen of Great Britain, residing at London, England, have invented new and useful Improvements in the Construction of Glass or Porcelain Lined Joints for Connecting Lengths of Similarly-Lined Piping, (for which I have obtained a patent in Great Britain, No. 2,237, bearing date the 12th day of February, 1887,) of which the following is a specification.

Figure 1. is a side elevation of a T piece joint; Fig. 2. a section of same; Fig; 3. a view of glass T previous to being inclosed in the metal; Fig. 4 a side elevation of a cross joint; Fig. 5. a section of same; Fig. 6. a view of glass + previous to being inclosed in the metal.

In Figs. 1 and 4, the joints are made as follows. A metal T piece or cross of usual construction as used for connecting gas pipes, is first cut through longitudinally at line a, b, to form two halves A, B, between these are placed the glass T, C, or cross D,—Figs. 3 and 6,—and the piece A, B, secured together, on the glass by the screwed on collars E; further securing together of the pieces, A and B, could be assisted by tinning the edges with solder, and making the parts sufficiently hot to run the solder together; or in place of the collars E, the pieces A, B, could be placed in a sand mold and a band or bands of solder run round. The internal diameter of the metal T piece is larger than the glass T, to enable a layer of cement F, to be interposed between the glass and metal to hold the former truly central in the metal, and protect it from damage from the effects of a blow on the metal. After the glass and cement is inserted in the metal, the cement is dried in any suitable manner, and the ends of the joints ground to bring the metal, cement, and glass, perfectly flush and square. When connecting lengths of piping by these joints a washer is placed between the ends of joint and pipe, and the connection made by usual screw cap. A suitable cement may be made of a mixture of Portland cement and plaster of paris, mixed with water.

Having now described my invention, what I desire to secure by Letters Patent of the United States is—

A glass or porcelain lined metal T piece or + way joint for connecting lined piping, consisting of the metal parts A. B, glass C, collars E, and cement F, as described and set forth.

HENRY DUDLEY-COOPER.

Witnesses:
   F. PRINCE,
     1 *Quality Court, London, W. C.*
   E. BROWN.